(12) United States Patent
Kada et al.

(10) Patent No.: US 6,382,345 B2
(45) Date of Patent: May 7, 2002

(54) ELECTRIC POWER STEERING SYSTEM

(75) Inventors: Tomoyasu Kada, Kaizuka; Shiro Nakano, Chihayaakasaka-mura; Ryouhei Hayama, Nabari, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/778,713

(22) Filed: Feb. 8, 2001

(30) Foreign Application Priority Data

Feb. 29, 2000 (JP) ........................................ 2000-053766

(51) Int. Cl.$^7$ ................................................. B62D 5/04
(52) U.S. Cl. ...................................................... 180/446
(58) Field of Search ................. 180/443, 446; 701/41, 42

(56) References Cited

U.S. PATENT DOCUMENTS 5,927,430 A * 7/1999 Mukai et al. ............... 180/446
6,129,172 A * 10/2000 Yoshida et al. ............. 180/443

* cited by examiner

Primary Examiner—Kevin Hurley
(74) Attorney, Agent, or Firm—Rabin & Berdo, P.C.

(57) ABSTRACT

An electric power steering system, which controls an electric motor on the basis of a target electric current determined in accordance with a steering torque and applies a driving force from the electric motor to a steering mechanism. The system includes: a steering torque sensor; a target current setting circuit for determining the target electric current in accordance with the steering torque on the basis of an assist characteristic indicative of a relationship between the steering torque and the target electric current; a motor controlling circuit for controlling the electric motor on the basis of the target electric current; a traveling state judging circuit for judging whether or not a motor vehicle is in a slalom traveling state; and an assist characteristic modifying circuit for offsetting the assist characteristic from an initial characteristic level when the motor vehicle is in the slalom traveling state.

9 Claims, 5 Drawing Sheets

ELECTRIC POWER STEERING SYSTEM

BACKGROUND OF THE INVENTION

1. Field of the Invention

The present invention relates to an electric power steering system which assists a steering operation by applying a driving force from an electric motor to a steering mechanism, the electric motor being controlled for driving thereof in accordance with a steering torque.

2. Description of Related Art

An electric power steering system which assists a steering operation by transmitting a driving force from an electric motor to a steering mechanism is conventionally mounted in a motor vehicle. The electric motor is feedback-controlled on the basis of a target electric current determined in accordance with a steering torque applied to a steering wheel, whereby a steering assist force according to the steering torque is applied to the steering mechanism.

When a motor vehicle travels along a mountain road having continuous meanders, for example, the motor vehicle experiences a so-called slalom traveling state. During the slalom traveling, the steering angle and the steering torque tend to be greater than during ordinary traveling. This increases a burden on a driver even with the steering assist, so that an improvement is required for providing a more satisfactory steering feeling.

SUMMARY OF THE INVENTION

It is an object of the present invention to provide an electric power steering system which alleviates the burden on the driver during the slalom traveling for the improvement of the steering feeling.

The present invention is directed to an electric power steering system which is adapted to control an electric motor on the basis of a target electric current determined in accordance with a steering torque applied to an operation member and apply a driving force from the electric motor to a steering mechanism for steering assist. The system comprises: a steering torque sensor for detecting the steering torque; a target current setting circuit for determining the target electric current in accordance with the steering torque detected by the steering torque sensor on the basis of an assist characteristic indicative of a relationship between the steering torque and the target electric current; a motor controlling circuit for controlling the electric motor for driving thereof on the basis of the target electric current determined by the target current setting circuit; a traveling state judging circuit for judging whether or not a motor vehicle equipped with the electric power steering system is in a slalom traveling state; and an assist characteristic modifying circuit for offsetting the assist characteristic from an initial characteristic level when the traveling state judging circuit judges that the motor vehicle is in the slalom traveling state.

In accordance with the present invention, the assist characteristic which is employed as a basis for the determination of the target electric current according to the steering torque is modified to be offset from the initial characteristic level when the motor vehicle is in the slalom traveling state. During the slalom traveling, a steering assist force is generated, which is different from that to be generated when the motor vehicle is in any other traveling state.

That is, when the motor vehicle is in the slalom traveling state, the assist characteristic is offset from the initial characteristic level to cause the electric motor to generate a greater driving force than with the initial characteristic level, whereby a greater steering assist force is applied to the steering mechanism than in an ordinary traveling state. Thus, a slalom steering operation can advantageously be assisted, in which a steering direction is frequently changed and a steering angle is changed by greater degrees. Therefore, the burden on the driver can be alleviated for the improvement of the steering feeling.

The traveling state judging circuit maybe adapted to judge that the motor vehicle is in the slalom traveling state if a frequency at which the steering torque detected by the steering torque sensor increases to not smaller than a first predetermined torque level (e.g., 3 Nm) reaches a predetermined reference frequency level. Thus, the slalom traveling state can assuredly be detected when a greater steering torque level is detected at a higher frequency.

The traveling state judging circuit may include a circuit which is adapted to judge that the motor vehicle is brought out of the slalom traveling state when the steering torque detected by the steering torque sensor is continuously kept at not greater than a second predetermined torque level (which is preferably smaller than the first predetermined torque level, e.g., 2 Nm) for not shorter than a first time period (e.g., 30 seconds).

Thus, the fact that the motor vehicle is brought out of the slalom traveling state can be detected on the basis of the detected steering torque level.

The assist characteristic modifying circuit preferably includes a forward stroke steering judging circuit for judging whether or not a forward stroke steering operation is performed, and is adapted to offset the assist characteristic from the initial characteristic level in response to the judgment that the forward stroke steering operation is performed.

With this arrangement, a greater steering assist force can be applied to the steering mechanism when the forward stroke steering operation is performed during the slalom traveling. Therefore, the burden on the driver can effectively be alleviated.

The forward stroke steering judging circuit preferably includes a circuit which is adapted to judge that the forward stroke steering operation is performed when the steering torque detected by the steering torque sensor is continuously kept at not smaller than a third predetermined torque level (which is preferably smaller than the first predetermined torque level and may be substantially equal to the second predetermined torque level, e.g., 2 Nm) for not shorter than a second time period (which is preferably shorter than the first time period, e.g., 0.1 second).

With this arrangement, the forward stroke steering operation of the operation member during the slalom traveling is detected on the basis of the detected steering torque level, and the assist characteristic is modified so as to generate a greater steering assist force in this state.

The assist characteristic modifying circuit is preferably adapted to sequentially modify the assist characteristic in accordance with a change in the steering torque detected by the steering torque sensor.

With this arrangement, the assist characteristic is sequentially modified in accordance with the change in the steering torque during the slalom traveling. Therefore, the steering assist force can properly be generated at any time during the slalom traveling.

The assist characteristic modifying circuit preferably includes a return stroke steering judging circuit for judging whether or not a return stroke steering operation is performed, and is adapted to return the assist characteristic to the initial characteristic level when it is judged that the return stroke steering operation is performed.

With this arrangement, the steering assist force is reduced to increase the steering torque during the return stroke steering operation, so that a proper return steering feeling can be provided for the improvement of the steering feeling.

The return stroke steering judging circuit preferably includes a circuit which is adapted to judge that the return stroke steering operation is performed when a time-based differential value of the steering torque detected by the steering torque sensor decreases to smaller than a predetermined value (e.g., −10 Nm/second).

With this arrangement, a state where the operation member is relatively quickly returned to a neutral position for the return stroke steering operation during the slalom traveling is detected on the basis of the time-based differential value of the steering torque, and the assist characteristic is returned to the initial characteristic level in this state.

The return stroke steering judging circuit may include a circuit which is adapted to judge that the return stroke steering operation is performed when the steering torque detected by the steering torque sensor is continuously kept reduced for longer than a third time period (which is preferably shorter than the first time period and substantially equal to the second time period, e.g., 0.1 second).

With this arrangement, a state where the operation member is relatively slowly returned to the neutral position for the return stroke steering operation during the slalom traveling is detected on the basis of the detected steering torque value, and the assist characteristic is returned to the initial characteristic level in this state.

The foregoing and other objects, features and effects of the present invention will become more apparent from the following description of the preferred embodiments with reference to the attached drawings.

DESCRIPTION OF THE PREFERRED EMBODIMENTS

Figure 1:
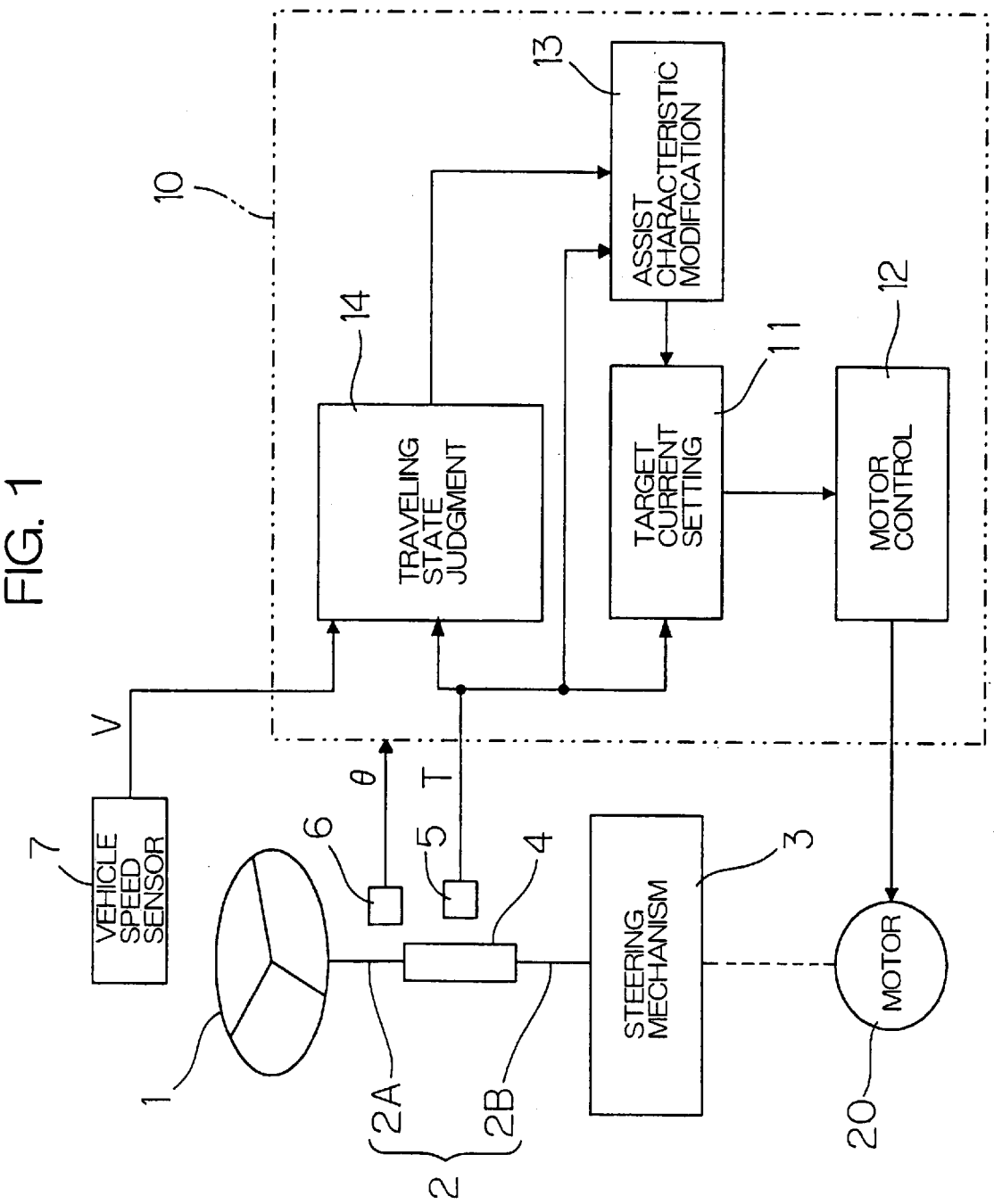
FIG. 1 is a block diagram illustrating the electrical construction of an electric power steering system according to one embodiment of the present invention.

FIG. 1 is a block diagram illustrating the electrical construction of an electric power steering system according to one embodiment of the present invention. A steering torque applied to a steering wheel 1 as an operation member is transmitted to a steering mechanism 3 via a steering shaft 2. A driving force generated by an electric motor 20 is transmitted as a steering assist force to the steering mechanism 3.

The steering shaft 2 is divided into an input shaft 2A coupled to the side of the steering wheel 1 and an output shaft 2B coupled to the side of the steering mechanism 3. The input shaft 2A and the output shaft 2B are coupled to each other by a torsion bar 4. The torsion bar 4 experiences a torsion in accordance with a steering torque T, and the direction and magnitude of the torsion are detected by a torque sensor 5. An output signal of the torque sensor 5 is inputted to a controller (ECU) 10.

The controller 10 applies a driving electric current to the electric motor 20 in accordance with the steering torque T detected by the torque sensor 5 to control the electric motor 20 for driving thereof so that a steering assist force is applied to the steering mechanism 3 in accordance with the steering torque T. The controller 10 receives, in addition to the output signal of the torque sensor 5, an output signal of a steering angle sensor 6 for detecting a steering angle θ as the rotation angle of the steering wheel 1 and an output signal of a vehicle speed sensor 7 for detecting the speed V of a motor vehicle equipped with the inventive electric power steering system.

The controller 10 causes a built-in microprocessor to perform program-based processes so as to effect the function of a target current setting section 11 for determining a target electric current according to the steering torque T, the function of a motor controlling section 12 for feedback-controlling the electric motor 20 on the basis of the target electric current determined by the target current setting section 11, the function of an assist characteristic modifying section 13 for modifying an assist characteristic indicative of a characteristic relationship of the steering torque versus the target electric current in the target current setting section 11, and the function of a traveling state judging section 14 for judging whether or not the motor vehicle is in a slalom traveling state.

The traveling judging section 14 judges, on the basis of the vehicle speed V detected by the vehicle speed sensor 7 and the steering torque T detected by the torque sensor 5, whether or not the motor vehicle is in the slalom traveling state, and applies a signal indicative of the judgment result to the assist characteristic modifying section 13.

Figure 2:
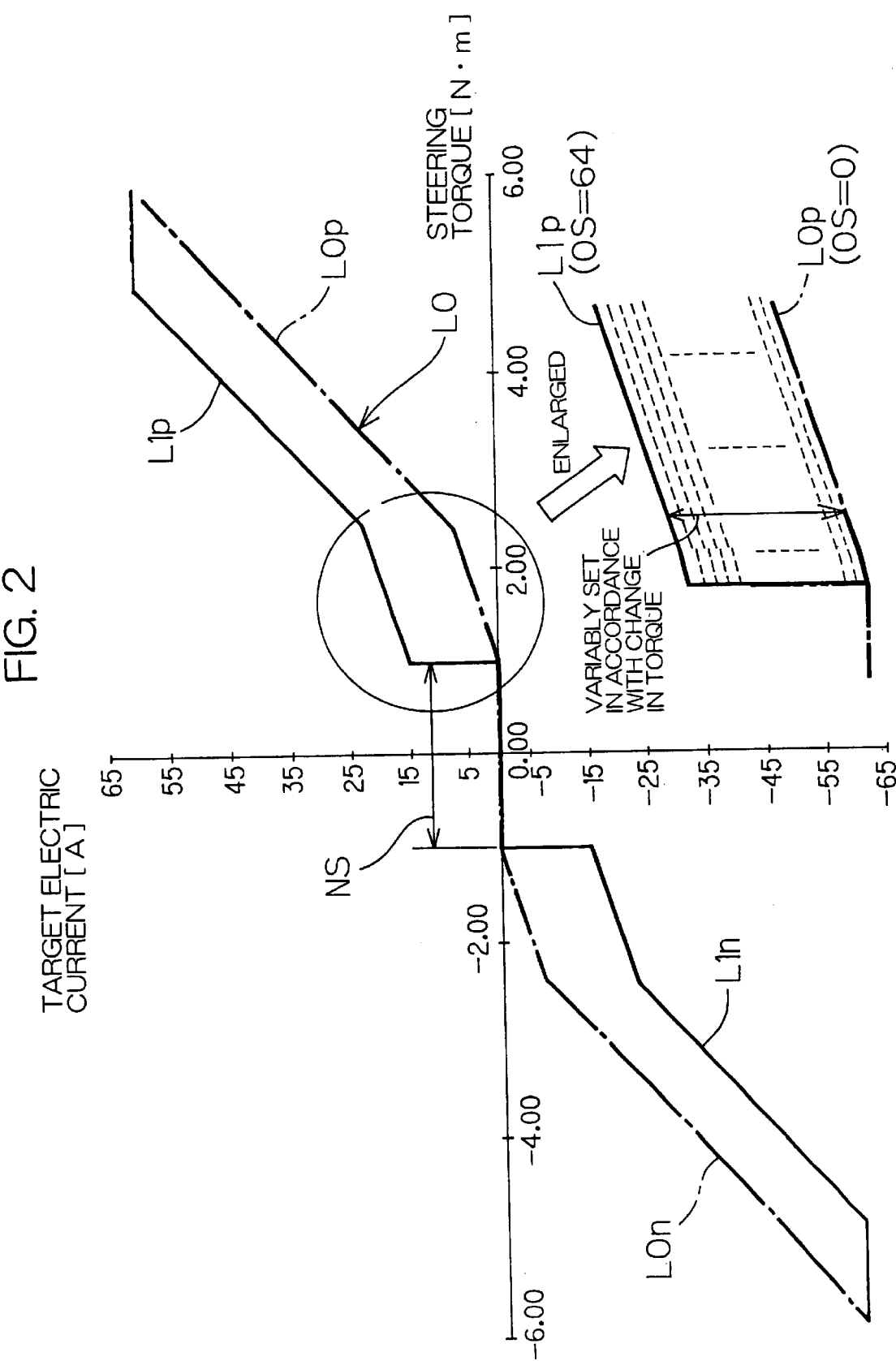
FIG. 2 is a diagram illustrating an exemplary assist characteristic.

FIG. 2 is a diagram illustrating an exemplary assist characteristic which is to be employed when the target current setting section 11 determines the target electric current. An initial characteristic level is indicated by a curve L0 and, when the motor vehicle is in a traveling state other than the slalom traveling state, the target current setting section 11 determines the target electric current for the steering torque T on the basis of the curve L0. The steering torque T detected by the torque sensor 5 has a plus sign if its direction is for the right turn of the steering wheel 1 (hereinafter referred to as "right rotation torque") and has a minus sign if its direction is for the left turn of the steering wheel 1 (hereinafter referred to as "left rotation torque"). The target electric current has a positive value when a torque is to be applied to the steering mechanism 3 for right turn thereof, and has a negative value when a torque is to be applied to the steering mechanism 3 for left turn thereof.

A predetermined range of the steering torque T around zero is defined as a so-called dead zone NS, and the target electric current is set at zero irrespective of the value of the steering torque T within the dead zone NS. For convenience of explanation, a positive portion of the curve L0 away from the dead zone NS is hereinafter referred to as a positive initial assist characteristic curve L0p, and a negative portion of the curve L0 away from the dead zone NS is herein after referred to as a negative initial assist characteristic curve L0n. Similarly, a positive portion of the assist characteristic curve away from the dead zone NS is referred to as a positive assist characteristic curve, and a negative portion of the assist characteristic curve away from the dead zone NS is referred to as a negative assist characteristic curve.

In this embodiment, when the slalom traveling state is detected with a forward stroke steering operation being performed to turn the steering wheel 1 away from a neutral position, the positive assist characteristic curve or the negative assist characteristic curve is offset from the initial assist characteristic curve L0$p$ or L0$n$ by the operation of the assist characteristic modifying section 13. More specifically, when the forward stroke steering operation is detected with a right rotation torque being applied to the steering wheel 1 during the slalom traveling, the positive assist characteristic curve is gradually offset from the positive initial assist characteristic curve L0$p$ in such a direction as to increase the target electric current. Similarly, when the forward stroke steering operation is detected with a left rotation torque being applied to the steering wheel 1 during the slalom traveling, the negative assist characteristic curve is gradually offset from the negative initial assist characteristic curve L0$n$ in such a direction as to reduce the target electric current (or to increase the absolute value of the target electric current).

Even during the slalom traveling, the target electric current is determined on the basis of the initial assist characteristic curve L0$p$ or L0$n$ if a return stroke steering operation is performed to return the steering wheel 1 to the neutral position.

That is, when the forward stroke steering operation is performed during the slalom traveling, a steering assist force greater than that to be applied when the motor vehicle is in any other traveling state is applied to the steering mechanism 3 by the electric motor 20. Thus, a burden on a driver who holds the steering wheel 1 is alleviated.

In this embodiment, the assist characteristic curve is further modified in accordance with a change in the steering torque T when the forward stroke steering operation is performed during the slalom traveling. More specifically, the positive assist characteristic curve is modified within a zone defined between the positive initial characteristic curve L0$p$ and a positive upper limit assist characteristic curve L1$p$ so as to increase or reduce the target electric current. Similarly, the negative assist characteristic curve is further modified within a zone defined between the negative initial characteristic curve L0$n$ and a negative lower limit assist characteristic curve L1$n$ so as to increase or reduce the target electric current.

When the forward stroke steering operation is performed during the slalom traveling, the assist characteristic is modified in accordance with the change in the steering torque T applied to the steering wheel 1, so that the steering assist force is properly applied to the steering mechanism 3. Thus, a satisfactory steering feeling can be provided.

Figure 3:
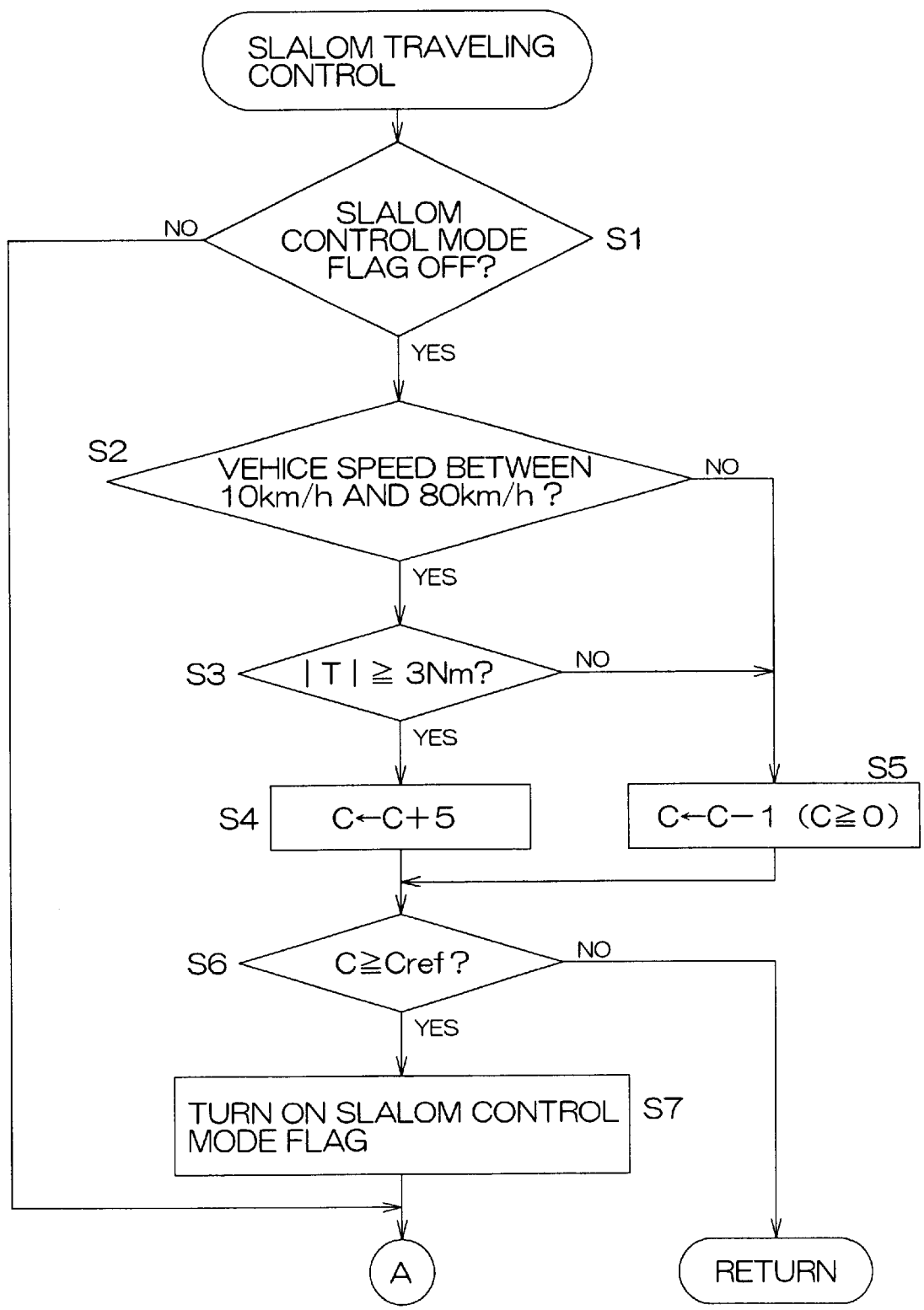
FIG. 3 is a flow chart for explaining an exemplary process for modifying the assist characteristic.
Figure 4:
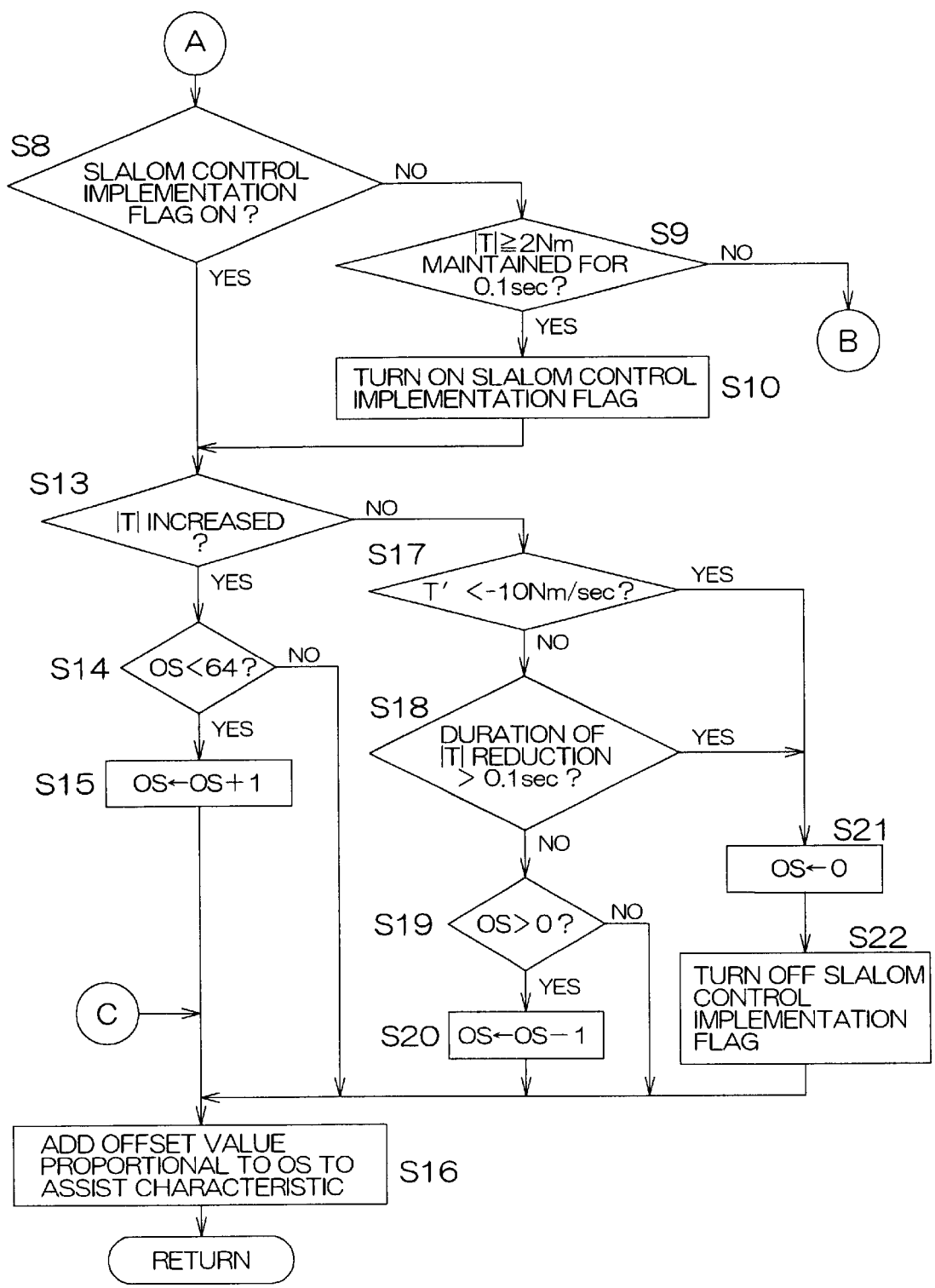
FIG. 4 is a flow chart for explaining the exemplary process for modifying the assist characteristic.
Figure 5:
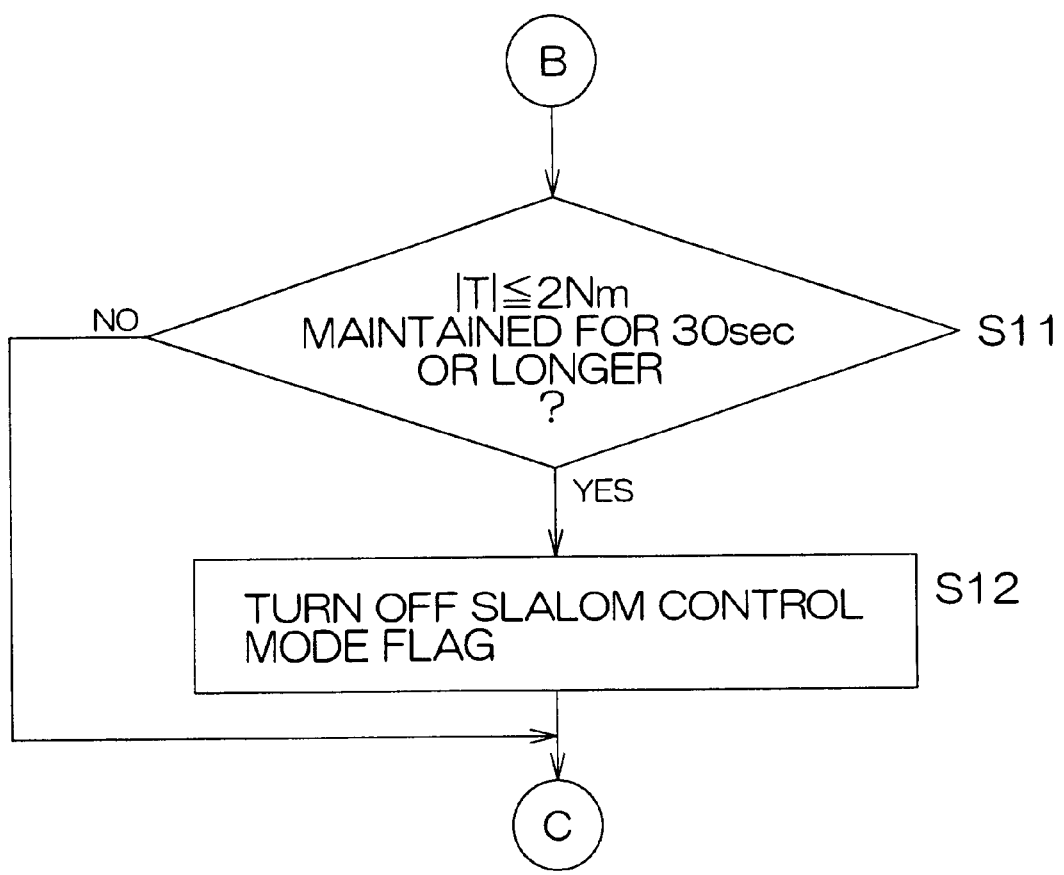
FIG. 5 is a flow chart for explaining the exemplary process for modifying the assist characteristic.

FIGS. 3, 4 and 5 are flow charts for explaining a specific example of a process to be performed by the traveling state judging section 14 and the assist characteristic modifying section 13. In this example, the zones defined between the positive initial assist characteristic curve L0$p$ and the positive upper limit assist characteristic curve L1$p$ and between the negative initial assist characteristic curve L0$n$ and the negative lower limit assist characteristic curve L1$n$ are each divided into 64 levels, and an assist characteristic curve corresponding to one of these levels is selected on the basis of an offset value OS ($0 \leq OS \leq 64$). The positive and negative initial assist characteristic curves L0$p$, L0$n$ each correspond to an offset value of OS=0, while the positive upper limit assist characteristic curve L1$p$ and the negative lower limit assist characteristic curve L1$n$ each correspond to an offset value of OS=64.

More specifically, an offset target electric current is obtained by addition (T>0) or subtraction (T<0) of a value corresponding to the offset value OS (e.g., a value proportional to the offset value OS) to/from the target electric current (normal value) determined on the basis of the steering torque T in accordance with the positive or negative initial assist characteristic curve L0$p$ or L0$n$. As a result, a target electric current level according to the offset assist characteristic curve is determined.

The process shown in FIGS. 3, 4 and 5 is repeatedly performed in a predetermined control cycle during the operation of the electric power steering system (during which an ignition key switch is on).

More specifically, it is first judged whether or not a slalom control mode flag indicative of the slalom traveling state is off (Step S1). If the motor vehicle is not in the slalom traveling state, the slalom control mode flag is off. In this case, it is judged whether or not the vehicle speed V detected by the vehicle speed sensor 7 is within a range, for example, between 10 km and 80 km per hour (Step S2). If the vehicle speed V is out of this range, there is a high possibility that the motor vehicle is not in the slalom traveling state. In this case, a judgment value C indicative of whether or not the motor vehicle is in the slalom traveling state is decremented by "1" (Step S5). However, the judgment value C has a lower limit of zero for the decrementation.

If it is judged in Step S2 that the vehicle speed V is within the range between 10 km and 80 km per hour, the steering torque T detected by the torque sensor 5 is checked. If a condition that the absolute value of the steering torque T (hereinafter expressed as "steering torque |T|") is not smaller than 3 Nm (first predetermined torque level) is satisfied (YES in Step S3), the judgment value C is incremented by "5" (Step S4).

After the judgment value C is updated in Step S4 or S5, it is judged whether or not the judgment value C reaches a reference judgment value Cref (Step S6). If it is judged that the judgment value C reaches the reference judgment value Cref, the slalom control mode flag is turned on (Step S7). If the judgment value C does not reach the reference judgment value Cref, a process sequence from Step S1 is repeated.

The judgment value C indicates a frequency at which the steering torque |T| increases to not smaller than 3 Nm. During the slalom traveling, the forward stroke steering operation in which the steering wheel 1 is turned away from the neutral position and the return stroke steering operation in which the steering wheel 1 is returned to the neutral position are alternately repeated. Therefore, the steering torque |T| is not necessarily kept at greater levels, but alternately increases to a greater level and decreases to a smaller level. Since the judgment value C is incremented by "5" when the steering torque |T| is not smaller than 3 Nm and the judgment value C is decremented by "1" when the steering torque |T| is smaller than 3 Nm, the slalom traveling state of the motor vehicle can promptly and assuredly be detected.

When the slalom control mode flag is turned on (Step S7), the process goes to Step S8 in FIG. 4 to judge whether or not the slalom control implementation flag is on. Immediately after the slalom control mode flag is turned on, the slalom control implementation flag is off and, therefore, the process goes to Step S9.

In Step S9, it is judged whether or not the forward stroke steering operation is performed. That is, it is judged whether a state where the steering torque |T| detected by the torque sensor 5 is, for example, not smaller than 2 Nm (third predetermined torque level) is maintained, for example, for 0.1 second (second time period). If the judgment is positive, it is judged that the forward stroke steering operation is performed, and the slalom control implementation flag is turned on (Step S10). On the contrary, if the state where the steering torque |T| is not smaller than 2 Nm is not maintained for 0.1 second or longer (NO in Step S9), a process shown in FIG. 5 is performed to judge whether or not the motor vehicle is brought out of the slalom traveling state.

That is, it is judged whether a period during which the steering torque |T| is kept, for example, at not greater than 2 Nm (second predetermined torque level) reaches 30 seconds (first time period) (Step S11). If this judgment is positive, it is judged that the motor vehicle is brought out of the slalom traveling state, and the slalom control mode flag is turned off (Step S12). If the judgment in Step S11 is negative, it is judged that the motor vehicle is kept in the slalom traveling state, and the slalom control mode flag is kept on.

If the slalom control mode flag is on and the slalom control implementation flag is on, it is judged whether or not the steering torque |T| is increased as compared with a steering torque level observed in the preceding control cycle (Step S13). If it is judged that the steering torque |T| is increased, it is determined whether the offset value OS is smaller than "64" which is the upper limit thereof (Step S14). If the offset value is smaller than the upper limit "64", the offset value OS is incremented by "1" (Step S15). Then, the assist characteristic is modified on the basis of the offset value OS thus determined (Step S16).

On the other hand, if it is judged in Step S13 that the steering torque |T| is not increased as compared with the steering torque level observed in the preceding control cycle, it is judged whether a time-based differential value T' of the steering torque |T| is smaller than −10 Nm/second, for example (Step S17). If the time-based differential value T' of the steering torque |T| is smaller than −10 Nm/second, it is judged that the return stroke steering operation is performed to relatively quickly return the steering wheel 1 to the neutral position, and the offset value OS is set at zero which is the initial value (Step S21). After the slalom control implementation flag is turned off (Step S22), the target electric current of the electric motor 20 is determined on the basis of the assist characteristic corresponding to the offset value of OS=0, i.e., the ordinary assist characteristic (initial assist characteristic curve L0p or L0n) (Step S16). Therefore, the steering assist force is applied to the steering mechanism 3 in accordance with the ordinary assist characteristic when the return stroke steering operation is performed during the slalom traveling state.

When the return stroke steering operation is performed to slowly return the steering wheel 1 to the neutral position, the judgment in Step S17 maybe negative. In such a case, it is judged whether the steering torque |T| is kept reduced, for example, for not shorter than 0.1 second (Step S18). If this judgment is positive, it is judged that the return stroke steering operation is relatively slowly performed, so that a process sequence of Steps S21 and S22 is performed to generate the steering assist force in accordance with the initial assist characteristic curve L0p or L0n.

On the other hand, if the judgments in Steps S17 and S18 are negative so that it is judged that the return stroke steering operation is not performed but the steering torque |T| is reduced, the offset value OS is decremented by "1" (Step S20) on condition that the offset value OS is greater than zero (Step S19). The assist characteristic is determined on the basis of the offset value OS thus decremented, and the target electric current of the electric motor 20 is determined in accordance with the assist characteristic thus modified.

This situation may occur, for example, when the motor vehicle travels along a composite curve having different curvature radii during the slalom traveling, i.e., along a curve having a smaller curvature radius at the beginning thereof and a greater curvature radius at the middle thereof.

Only when the forward stroke steering operation is performed during the slalom traveling, the assist characteristic is thus properly modified within the zone between the positive initial assist characteristic curve L0p and the upper limit assist characteristic curve L1p or between the negative initial assist characteristic curve L0n and the lower limit assist characteristic curve L1n. When the forward stroke steering operation is performed during the slalom traveling, a greater steering assist force is provided as compared with a case where the motor vehicle is in the ordinary traveling state. Therefore, a steering burden on a driver who repeatedly performs the forward stroke steering operation is alleviated. Even during the slalom traveling, the offset value OS is set at zero when the return stroke steering operation is performed, and the ordinary assist characteristic is employed. Therefore, a returning resistance can be provided to the steering wheel 1 to provide a satisfactory steering feeling.

When the forward stroke steering operation is performed, the assist characteristic can be set in accordance with the steering torque |T| by increasing or reducing the offset value OS in accordance with the change in the steering torque |T|. Therefore, the steering assist force can be applied to the steering mechanism 3 without any excess or deficiency. Thus, the steering feeling can be improved during the slalom traveling.

More specifically, the positive assist characteristic is modified so that the target electric current is increased in accordance with an increase in the offset value OS and reduced in accordance with a reduction in the offset value OS. Similarly, the negative assist characteristic is modified so that the target electric current is reduced (or the absolute value thereof is increased) in accordance with an increase in the offset value OS and the target electric current is increased (or the absolute value thereof is reduced) in accordance with a reduction in the offset value OS.

While one embodiment of the present invention has thus been described, the invention can be embodied in any other ways. Although the frequency of the occurrence of the increase in the steering torque |T| is detected on the basis of the judgment value C which is incremented by "5" when the steering torque |T| increases to not smaller than 3 Nm and decremented by "1" when the steering torque |T| decreases to smaller than 3 Nm in the embodiment described above, the judgment on the slalom traveling state of the motor vehicle may be based on a condition that the number of times of occurrence of the state where the steering torque increases to not smaller than 3 Nm exceeds a predetermined reference value within a predetermined time period.

When the forward stroke steering operation is performed during the slalom traveling, the assist characteristic is modified in accordance with the change in the steering torque |T| in the embodiment described above, but the offset value may be set at a constant level so that a steering assist force which is generally greater than that determined on the basis of the ordinary assist characteristic can be applied to the steering mechanism 3.

Although the judgment on the forward stroke steering operation is based on the condition that the steering torque |T| is continuously kept at not smaller than 2 Nm for not shorter than 0.1 second in the embodiment described above, the detection of the forward stroke steering operation may be achieved, for example, on the basis of the steering angle θ detected by the steering angle sensor 6 or a time-related change in the steering angle. Similarly, the detection of the return stroke steering operation may be achieved on the basis of the steering angle θ detected by the steering angle sensor 6 or the time-related change in the steering angle.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 2000-053766 filed to the Japanese Patent Office on Feb. 29, 2000, the disclosure thereof being incorporated herein by reference.

What is claimed is:

1. An electric power steering system which is adapted to control an electric motor on the basis of a target electric current determined in accordance with a steering torque applied to an operation member and apply a driving force from the electric motor to a steering mechanism for steering assist, the electric power steering system comprising:

steering torque sensor for detecting the steering torque;

target current setting circuit for determining the target electric current in accordance with the steering torque detected by the steering torque sensor on the basis of an assist characteristic indicative of a relationship between the steering torque and the target electric current;

motor controlling circuit for controlling the electric motor for driving thereof on the basis of the target electric current determined by the target current setting circuit;

traveling state judging circuit for judging whether or not a motor vehicle equipped with the electric power steering system is in a slalom traveling state; and assist characteristic modifying circuit for offsetting the assist characteristic from an initial characteristic level when the traveling state judging circuit judges that the motor vehicle is in the slalom traveling state.

2. An electric power steering system as set forth in claim 1, wherein the traveling state judging circuit judges that the motor vehicle is in the slalom traveling state if a frequency at which the steering torque detected by the steering torque sensor increases to not smaller than a first predetermined torque level reaches a predetermined reference frequency level.

3. An electric power steering system as set forth in claim 1, wherein the traveling state judging circuit includes a circuit which judges that the motor vehicle is brought out of the slalom traveling state when the steering torque detected by the steering torque sensor is continuously kept at not greater than a second predetermined torque level for not shorter than a first time period.

4. An electric power steering system as set forth in claim 1, wherein the assist characteristic modifying circuit includes forward stroke steering judging circuit for judging whether or not a forward stroke steering operation is performed, and offsets the assist characteristic from the initial characteristic level in response to the judgment that the forward stroke steering operation is performed.

5. An electric power steering system as set forth in claim 4, wherein the forward stroke steering judging circuit includes a circuit which judges that the forward stroke steering operation is performed when the steering torque detected by the steering torque sensor is continuously kept at not smaller than a third predetermined torque level for not shorter than a second time period.

6. An electric power steering system as set forth in claim 1, wherein the assist characteristic modifying circuit sequentially modifies the assist characteristic in accordance with a change in the steering torque detected by the steering torque sensor.

7. An electric power steering system as set forth in claim 1, wherein the assist characteristic modifying circuit includes return stroke steering judging circuit for judging whether or not a return stroke steering operation is performed, and returns the assist characteristic to the initial characteristic level when it is judged that the return stroke steering operation is performed.

8. An electric power steering system as set forth in claim 7, wherein the return stroke steering judging circuit includes a circuit which judges that the return stroke steering operation is performed when a time-based differential value of the steering torque detected by the steering torque sensor decreases to smaller than a predetermined value.

9. An electric power steering system as set forth in claim 7, wherein the return stroke steering judging circuit includes a circuit which judges that the return stroke steering operation is performed when the steering torque detected by the steering torque sensor is continuously kept reduced for longer than a third time period.

* * * * *